United States Patent
Chen et al.

(10) Patent No.: US 11,799,530 B2
(45) Date of Patent: Oct. 24, 2023

(54) BEAM MANAGEMENT WITH MATCHING NETWORKS

(71) Applicant: Telefonaktiebolaget LM Ericsson (publ), Stockholm (SE)

(72) Inventors: Tsao-Tsen Chen, Täby (SE); Erik Larsson, Uppsala (SE); Anders Stjernman, Lindóme (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

(21) Appl. No.: 17/613,846

(22) PCT Filed: May 28, 2019

(86) PCT No.: PCT/SE2019/050493
§ 371 (c)(1),
(2) Date: Nov. 23, 2021

(87) PCT Pub. No.: WO2020/242355
PCT Pub. Date: Dec. 3, 2020

(65) Prior Publication Data
US 2022/0239353 A1     Jul. 28, 2022

(51) Int. Cl.
*H04B 7/06*      (2006.01)
*H04B 7/08*      (2006.01)
*H01Q 3/36*      (2006.01)

(52) U.S. Cl.
CPC ......... *H04B 7/0617* (2013.01); *H04B 7/0695* (2013.01); *H04B 7/088* (2013.01); *H01Q 3/36* (2013.01)

(58) Field of Classification Search
CPC .... H04B 7/0617; H04B 7/0695; H04B 7/088; H01Q 3/36; H01Q 1/523; H01Q 3/2605
(Continued)

(56) References Cited

U.S. PATENT DOCUMENTS

| 2009/0184879 A1 | 7/2009 | Derneryd et al. |
| 2018/0212651 A1* | 7/2018 | Li ................... H04B 7/0686 |
| 2019/0387479 A1* | 12/2019 | Gong ............... H04W 72/1268 |

FOREIGN PATENT DOCUMENTS

| EP | 1 349 234 A2 | 10/2003 |
| JP | 3265953 B2 | 3/2002 |
| WO | 2007/124766 A1 | 11/2007 |

OTHER PUBLICATIONS

International Search Report and Written Opinion dated Dec. 16, 2019 in International Application No. PCT/SE2019/050493 (10 pages total).

(Continued)

*Primary Examiner* — Fitwi Y Hailegiorgis
(74) *Attorney, Agent, or Firm* — Rothwell, Figg, Ernst & Manbeck, P.C.

(57) ABSTRACT

A method is provided. The method includes determining a set of beam indexes including a first beam index and a second beam index; and determining a set of candidate matching networks. The method further includes performing an assigning step, where the assigning step includes: (a1) assigning a first matching network from the set of candidate matching networks to a first beam index; and (a2) assigning a second matching network from the set of candidate matching networks to a second beam index. The first matching network is different from the second matching network.

18 Claims, 10 Drawing Sheets

(58) Field of Classification Search
USPC .......................................................... 375/262
See application file for complete search history.

(56) References Cited

OTHER PUBLICATIONS

Warnick, K. F., "Efficiencies and System Temperature for a Beamforming Array", IEEE Antennas and Wireless Propagation Letters, vol. 7, Jan. 2008, Piscataway, NJ, XP011330760, pp. 565-568 (4 pages total).

* cited by examiner

BEAM MANAGEMENT WITH MATCHING NETWORKS

CROSS REFERENCE TO RELATED APPLICATION(S)

This application is a 35 U.S.C. § 371 National Stage of International Patent Application No. PCT/SE2019/050493, filed May 28, 2019.

TECHNICAL FIELD

Disclosed are embodiments related to beam management, and in particular, beam management with matching networks.

BACKGROUND

Mutual coupling between antenna elements in an antenna array will change the impedance of antenna elements, and this will in turn result in power loss in antenna elements. Mutual coupling will also change the radiation pattern of elements. For 5G (fifth generation) wireless communications, the mutual coupling effect will become intense, since one antenna array panel will usually be packed with a large number of antenna elements which will increase mutual coupling.

WIPO Publication 2007/124766 (hereinafter "the Stjernman publication") discloses a method and device for coupling cancellation of closely spaced antennas, the disclosure of which is herein incorporated by reference in its entirety. The Stjernman publication considers an antenna array with mutual coupling between antenna elements, and provides for an antenna array system with a compensation network and a matching network for managing the coupling effect. This system is illustrated in FIG. 1. As shown, antenna system 100 includes an antenna array 102 having a plurality of closely-spaced antenna elements, which are individually labeled as $A_1, A_2, \ldots, A_M$. There are three networks stacked together, the compensation network 104, the matching network 106, and the beamforming network 108.

The compensation network 104 is used to eliminate or reduce the coupling between antenna elements and to de-correlate the respective antenna signals. Such networks are hard to realize for a large number of elements M, and will in general not be lossless, reducing the benefits of such networks in practice. The beamforming network 108 also has a similar complexity issue, being hard to realize for a large number of elements M. Embodiments to be described herein focus primarily on improvements to the matching network 106.

For simplicity, unless otherwise noted, it will be assumed that single polarization is used by the antenna array. Extension from single polarization to dual polarization is also encompassed by the embodiments disclosed herein.

The antenna array 102 includes M antenna elements ($A_1, A_2, \ldots, A_M$) which can each include sub-elements connected with fixed-power combing networks. Mutual coupling between antenna elements is modeled by the MxM scattering matrix S. In S, the diagonal entry $S_{ii}$ represents the reflection coefficient for the i-th element, and the off-diagonal entry $S_{ij}$ (where i≠j) represents the mutual coupling coefficient between i-th element and j-th element.

Let $V_i^+$ be the incident voltage wave amplitude from i-th generator to i-th element $A_i$, and $V_i^-$ be the reflected voltage wave amplitude from i-th element $A_i$ to i-th generator due to reflection and mutual coupling, as shown in FIG. 2. The incident and reflected voltage wave amplitudes at the i-th element are related by the i-th row of the scattering matrix S, as shown in the equation below:

$$V_i^- = \sum_{j=1}^{M} S_{ij} V_j^+$$

Therefore $V_i^-$ is the reflected voltage wave amplitude from i-th element plus all coupled voltage wave amplitudes from all other elements. The active reflection coefficient $S_a$ for the i-th element is then defined by the equation below:

$$S_a = \frac{V_i^-}{V_i^+} = S_{i1}\frac{V_1^+}{V_i^+} + \ldots + S_{ii}\frac{V_i^+}{V_i^+} + \ldots + S_{iM}\frac{V_M^+}{V_i^+}$$

Because $$\left[\frac{V_1^+}{V_i^+}, \ldots, \frac{V_M^+}{V_i^+}\right]^T$$

is proportional to the Mx1 excitation vector, where $[\ ]^T$ is the transpose operation, $S_a$ for the i-th element may also be expressed equivalently as:

$$S_a = S(i,:) * (\text{excitation.}/\text{abs}(\text{excitation}))$$

Matching network 106 is used to partially compensate the power loss from impedance mismatch such that the active reflection coefficient $S_a$ will become as small as possible after the matching network is applied. There are different types of matching networks according to different design criteria considered during rematch. Regardless of the particular type of matching network, the prior art uses one "fixed" matching network to rematch the antenna elements. Here, "fixed" means that the same matching network is used at all times. For the purpose of getting simulation results that are illustrated herein, the example matching network described in FIG. 3 has been used. However, other types of matching networks are within the scope of embodiments disclosed herein.

A typical fixed matching network based on the scattering matrix S is to rematch the antenna elements by the central element of the antenna array such that the active reflection for the all-ones excitation vector (i.e., ones(M,1)=[1, 1, . . . , 1]$^T$, also referred to as broadside excitation) will become as small as possible after the rematch. That is, the rematch is done to minimize the active reflection for the selected all-ones excitation vector and the selected central element. However, other criteria (that is, other than minimizing the active reflection) can also be considered by the matching network and are within the scope of embodiments disclosed herein. The example fixed matching network used for generating simulation results that are illustrated herein is based on the criterion of minimizing the active reflection, and is generated by the following steps:

(Step 1) Retrieve the full scattering matrix S between the antenna ports. For instance, this may be done by designing and simulating the full antenna array 102 with an electromagnetic design tool.

(Step 2) Select the excitation vector. Here, the broadside excitation (that is, excitation./abs(excitation)=ones(M,1)), is selected as the excitation vector, where ones(M,1) is an Mx1 vector with all entries equal to one, and "./" is the MATLAB array right division operator that performs element-wise division.

(Step 3) Determine the active reflection coefficient $S_a$ for the central element. For example, the active reflection coefficient may be generated by $S_a$=S(indc,:)*excitation, where indc is the index for the central row of S (i.e., for the central element of the array), and $S_a$ is a scalar.

(Step 4) Create adjustable matching networks $S_m$ and connect those to the ports, adjusting the parameters of the matching networks in such a way that the matched active reflection coefficient $S_{a,new}$=$S_{new}$(indc,:)*(excitation./abs (excitation)) will become as small as possible, where $S_{new}$ is the new scattering matrix after the matching network 106 is applied. For the example matching network shown in FIG. 3, the following 2-port network $S_m$ is connected to each antenna element:

$$S_m = \begin{bmatrix} S_{11} & S_{12} \\ S_{21} & S_{22} \end{bmatrix} = \begin{bmatrix} S_a^* & \sqrt{1-|S_a|^2} \\ \sqrt{1-|S_a|^2} & -S_a^* \end{bmatrix}$$

where S* denotes the conjugate of S. $V_{out}$ and $V_{in}$ (shown in FIG. 3) are related through $S_m$ by the following formula:

$$\begin{bmatrix} V_{in,i}^- \\ V_{out,i}^- \end{bmatrix} = \begin{bmatrix} S_{11} & S_{12} \\ S_{21} & S_{22} \end{bmatrix} * \begin{bmatrix} V_{in,i}^+ \\ V_{out,i}^+ \end{bmatrix}$$

Embedded elements refer to antenna elements embedded in a finite array of elements. Let the embedded element radiation patterns generated with a matching network be denoted by the T×M matrix E, where T is the number of (θ,ϕ) pairs; that is, E contains the radiation patterns over θ and ϕ for the M antenna elements after a matching network is applied.

Subarrays are constructed by grouping L antenna elements together for each subarray, by the M×D element virtualization matrix V, where D=M/L is the number of subarrays. That is, the element virtualization matrix V is used to transform the M antenna elements into D subarrays.

For analog beamforming (BF) with single polarization, the number of antenna ports is assumed to be p=1, and the Dxp=Dx1 BF weight vector W will be applied on the subarrays to generate the traffic beam. The antenna gain, a Tx1 vector for the T (θ,ϕ) pairs covering the whole sphere, used for the traffic beam is computed by:

antenna gain=10*log$_{10}$(E*V*W)

The maximum antenna gain for a specific BF weight vector W (or equivalently a specific traffic beam) is given by taking the maximum value for a given (θ,ϕ) pair:

$$\text{maximum antenna gain} = \max_{(\theta,\phi)}(10 * \log_{10}(E * V * W))$$

In the above formula, V*W is a Mxp=Mx1 vector for the analog BF, also denoted as an excitation vector. Note that antenna gain consists of element gain, subarray gain, and array gain. In embodiments described herein, BF weight vectors from grid-of-beam (GoB) are considered. With over-sampling factor O in both horizontal and vertical directions, there are D1=O*O*D different BF weight vectors or traffic beams.

Assuming that there are N receive antennas at the receiver, then the received OFDM downlink signal y for a specific resource element (a certain subcarrier in a certain symbol) can be written as the Nx1 vector y=HFW$_l$B$_k$s+z where H is the NxM channel matrix including path gain but not including antenna gain, F is a (non-linear) MxD antenna gain matrix function that includes effects from antenna elements, matching network, and subarray construction (that is, the MxD element virtualization matrix V), $W_l$ is a Dxp subarray virtualization matrix for digital beamforming, or a Dxp beamforming weight matrix for analog beamforming, $B_k$ is a pxr precoding matrix, s is the rx1 symbol vector and z is the Nx1 noise vector. For digital beamforming, the subarray virtualization matrix W maps p antenna ports to the D radio branches (subarrays), while the precoding matrix maps the r symbols to p antenna ports. For analog beamforming with single polarization and 1 antenna port, precoding matrix B=1 (with p=r=1), and r=1 symbol is multiplied with the Dx1 beamforming weight vector W.

Note that the element virtualization matrix V is included in F, but it can in some cases be separated out from F. Also, the embedded element radiation pattern E is a TxM matrix for M antenna elements over the directions indicated by the T (θ,ϕ) pairs covering the whole sphere. For a receiver with a certain direction and angular spread relative to the antenna array at the transmitter, only the radiation patterns from a subset T1 of the T (θ,ϕ) pairs will be used to compute the antenna gain for that specific receiver. Therefore, only a subset of rows, indicated by T1, from the matrix E are included in F.

The functional blocks for generating the received signal in downlink are illustrated by FIG. 4.

The function F is typically (semi) static, that is, it is not changing dynamically. This means that F can be absorbed into the channel matrix H, i.e. H̃=HF. Also, controllability from the gNB perspective typically occurs before the F function, i.e. W, B and s can all be dynamically controlled, whereas F cannot in general be dynamically controlled from the baseband (subarray construction can in some architectures be dynamically controlled). Similarly, observability from a UE perspective is typically based on the antenna ports, and therefore occurs after the W matrix. This affects what information needs to be absorbed into the channel matrix.

For feedback-based digital beamforming the gNB typically transmits m CSI-RS resources, each with p antenna ports, where each resource is associated with a subarray virtualization matrix $W_l$, l=1, . . . , m. The UE estimates the effective channel $H_{eff}$=H̃$W_l$ for each CSI-RS resource and calculates the preferred CSI-RS resource index and its associated precoding matrix B (together with some other channel state information (CSI), e.g. preferred rank and channel quality information). This information is then fed back to the gNB that then applies these preferred virtualization and precoding matrices when sending the data.

SUMMARY

Maximum antenna gains (including element gain, subarray gain, and array gain) of different traffic beams depend on the implementation of a matching network. For a fixed matching network, the maximum antenna gains may not be optimal for some traffic beams, which will limit the coverage of those traffic beams. For example, considering the results for a fixed matching as shown in FIG. 5, beams having a beam index from 65 to 78 and from 85 to 94 have much worse coverage than other beams. The results of FIG. 5 were made with the following parameters:

- 28 GHz, 8×8 array with 64 half-λ dipole elements and single vertical polarization, SA (subarray)=2×1, AOSA (array of subarray)=4×8, D=number of SA=4*8=32, no tilt.
- Analog beamforming, GoB with O=oversampling factor=2 and 2D-DFT. There are D1=O*O*D=128 traffic beams.
- Horizontal and vertical element separation=0.8λ.
- Fixed matching network by central element and all-ones excitation vector.

Embodiments disclosed herein provide for assigning multiple matching networks, e.g. assigning matching networks to each beam index. In this way, instead of using a fixed matching network, the matching networks may be assigned so as to improve overall system performance. For example, each beam index could be assigned an optimal matching network for that specific beam index. Optimal may mean that maximum gain is maximized for that beam index, and may also include other criteria (e.g. minimizing side-lobe values for MU-MIMO implementations). A matching network may be selected for each BF weight (in the analog BF case) or for each precoding matrix (in the digital BF case), e.g. to maximize the maximum antenna gain of the selected traffic beam. In some embodiments, a subset of the optimal matching networks are used (e.g. to reduce complexity compared to using the full set). The subset may be selected to improve performance, by optimizing a criteria such as improving the maximum antenna gains of traffic beams when compared to the fixed matching network.

Embodiments disclosed herein may also provide (in the case of feedback-based BF), for extending CSI-RS resources to cover different matching networks, and (in the case of reciprocity-based BF), hypothesis testing on different matching networks for CSI measurement.

Embodiments provide many advantages. For example, embodiments improve the performance of the antenna array, such as by improving maximum antenna gain relative to the fixed matching network of the prior art. Embodiments can do so with a modest to small amount of additional complexity.

According to a first aspect, a method is provided. The method includes determining a set of beam indexes including a first beam index and a second beam index; and determining a set of candidate matching networks. The method further includes performing an assigning step, where the assigning step comprises: (a1) assigning a first matching network from the set of candidate matching networks to a first beam index; and (a2) assigning a second matching network from the set of candidate matching networks to a second beam index. The first matching network is different from the second matching network.

In some embodiments, the method further includes performing a gain-determining step, wherein the gain-determining step comprises: (g1) determining a first gain value corresponding to the first beam index and the first matching network, wherein assigning the first matching network to the first beam index is based at least in part on the first gain value, and (g2) determining a second gain value corresponding to the second beam index and the second matching network, wherein assigning the second matching network to the second beam index is based at least in part on the second gain value.

In some embodiments, the method further includes performing a gain-determining step, wherein the gain-determining step comprises determining a corresponding gain value for each combination of beam index and candidate matching network in the set-product of the set of beam indexes and the set of candidate matching networks. The assigning step further comprises: assigning, for each beam index in the set of beam indexes that is not assigned a matching network, a corresponding matching network based on the corresponding gain values. Assigning the first matching network from the set of candidate matching networks to the first beam index is based on the corresponding gain value, and assigning the second matching network from the set of candidate matching networks to the second beam index is based on the corresponding gain value.

In some embodiments, the method further includes performing a side-lobe-determining step, wherein the side-lobe-determining step comprises determining a corresponding side-lobe value for each combination of beam index and candidate matching network in the set-product of the set of beam indexes and the set of candidate matching networks. The assigning step further comprises: assigning, for each beam index in the set of beam indexes that is not assigned a matching network, a corresponding matching network based on the corresponding side-lobe values. Assigning the first matching network from the set of candidate matching networks to the first beam index is based on the corresponding side-lobe value, and assigning the second matching network from the set of candidate matching networks to the second beam index is based on the corresponding side-lobe value.

In some embodiments, the assigning step results in each beam index being assigned a matching network that has the maximum gain value for the given beam index. In some embodiments, the assigning step results in a total of n unique matching networks being assigned to each of the beam indexes, n being less than the size of the set of beam indexes, and wherein the assigning step further results in a criteria related to the determined gain values being satisfied. In some embodiments, n is less than five.

In some embodiments, the criteria related to the determined gain values comprises a total gain value being maximized, wherein the total gain value is the sum for each beam index of the set of beam indexes of the corresponding gain value for that beam index and the corresponding matching network that is assigned to that beam index. In some embodiments, the criteria related to the determined gain values comprises a partial gain value being maximized, wherein the partial gain value is the sum for each beam index of a subset of the set of beam indexes of the corresponding gain value for that beam index and the corresponding matching network that is assigned to that beam index. In some embodiments, the criteria related to the determined gain values comprises a minimum gain value being maximized, wherein the minimum gain value is the minimum for each beam index of the set of beam indexes of the corresponding gain value for that beam index and the corresponding matching network that is assigned to that beam index. In some embodiments, the criteria related to the determined gain values comprises a total difference value being minimized, wherein the total difference value is the sum for each beam index of the set of beam indexes of the difference between the corresponding gain value for that beam index and the corresponding matching network that is assigned to that beam index and the average of each of the corresponding gain values.

In some embodiments, the first matching network is represented by a first pair (element1, excitation1) and the second matching network is represented by a second pair (element2, excitation2). In some embodiments, the method further includes associating a first set of channel state information (CSI) reference signals (RSs) (CSI-RSs) with the first matching network and a second set of CSI-RSs with the second matching network; receiving a CSI-RS information; and determining which matching network to use based on the received CSI-RS information. Determining which matching network to use based on the received CSI-RS information comprises selecting the first matching network if the received CSI-RS information belongs to the first set of CSI-RSs, and selecting the second matching network if the received CSI-RS information belongs to the second set of CSI-RSs. In some embodiments, the method further includes associating a third set of CSI-RSs with a third matching network, and wherein determining which matching network to use further comprises selecting the third matching network if the received CSI-RS information belongs to the third set of CSI-RSs.

According to a second aspect, a node is provided. The node includes a data storage system; and a data processing apparatus comprising a processor, wherein the data processing apparatus is coupled to the data storage system, and the data processing apparatus is configured to: determine a set of beam indexes including a first beam index and a second beam index; determine a set of candidate matching networks; and perform an assigning step. The assigning step comprises: (a1) assigning a first matching network from the set of candidate matching networks to a first beam index; and (a2) assigning a second matching network from the set of candidate matching networks to a second beam index. The first matching network is different from the second matching network.

According to a third aspect, a node is provided. The node includes a determining unit configured to determine a set of beam indexes including a first beam index and a second beam index; and further configured to determine a set of candidate matching networks. The node further includes an assigning unit configured to perform an assigning step. The assigning step comprises: (a1) assigning a first matching network from the set of candidate matching networks to a first beam index; and (a2) assigning a second matching network from the set of candidate matching networks to a second beam index. The first matching network is different from the second matching network.

According to a fourth aspect, a computer program is provided, which comprises instructions which when executed by processing circuitry of a node causes the node to perform the method of any of the embodiments of the first aspect.

According to a fifth aspect, a carrier containing the computer program of the fourth aspect is provided. The carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

As discussed above, a matching network may be selected by choosing the central element and the all-ones (or broadside) excitation vector. Embodiments described herein encompass such a selection, and additionally include matching networks based on other elements (other than the central element) and excitation vectors (other than the all-ones excitation vector).

Active impedance may be matched for excitation vectors other than the all-ones broadside excitation. For example, for an array with D subarrays and oversampling factor O in both horizontal and vertical directions, there are D1=O*O*D possible grid-of-beam (GoB) weight vectors W (size Dxp) for generating D1 traffic beams. The D1 excitation vectors, given by V*W./abs(V*W) where V is the MxD element virtualization matrix, can also be used in the generation of active reflection coefficient $S_a$. Therefore, there are D1+1 candidate excitation vectors (D1 from GoB plus the all-ones vector) for generating $S_a$. Indices 1 to D1 are used to represent the D1 excitations from GoB, while index D1+1 is used to represent the all-ones vector.

Active impedance may be matched for elements other than the central element, and may also be matched for "all elements". Therefore, there are M+1 candidate elements (M individual elements plus "all elements") for generating $S_a$. Indices 1 to M are used to represent the M individual elements, while index M+1 is used to represent "all elements".

Using this nomenclature, the typical fixed matching network is generated by the pair (element, excitation)=(indc, D1+1), where indc is the index for the central row of S and D1+1 indicates the all-ones excitation. Matching networks may be generated using other values for the pair (element, excitation), with the formulas discussed above. For the "all elements" element (M+1), a modification of the formulas discussed above is needed.

For "all elements", (step 3) and (step 4) for creating the example fixed matching network in previous section are modified as follows:

(Step 3) Active reflection coefficient $S_a$ for "all elements" is generated by $S_a=S*$excitation, where $S_a=[S_a^1, \ldots, S_a^M]*$ is a Mx1 vector (instead of a scalar value as before).

Figure 1:
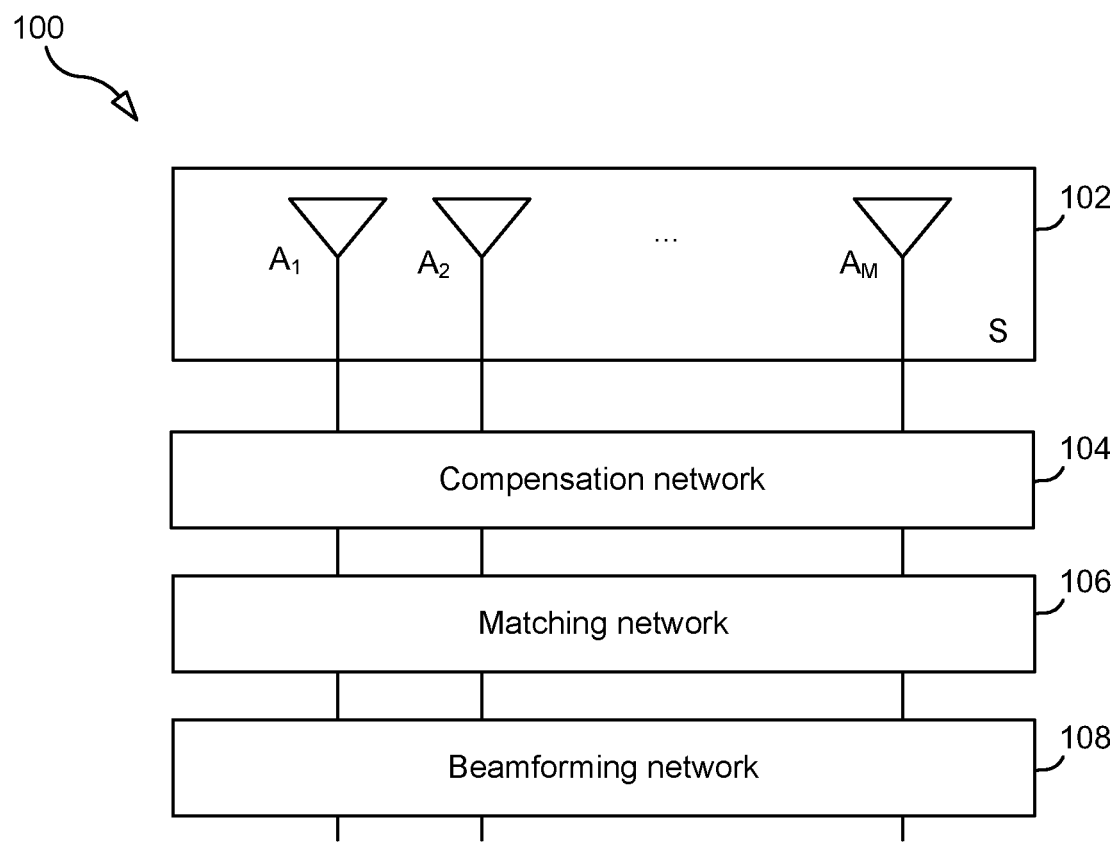
FIG. 1 shows a system.
Figure 2:
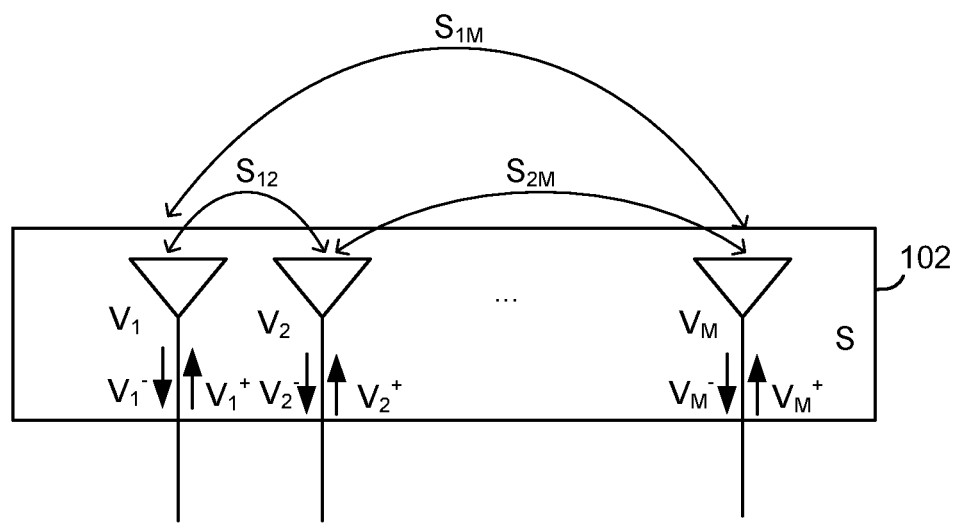
FIG. 2 shows an antenna array.
Figure 3:
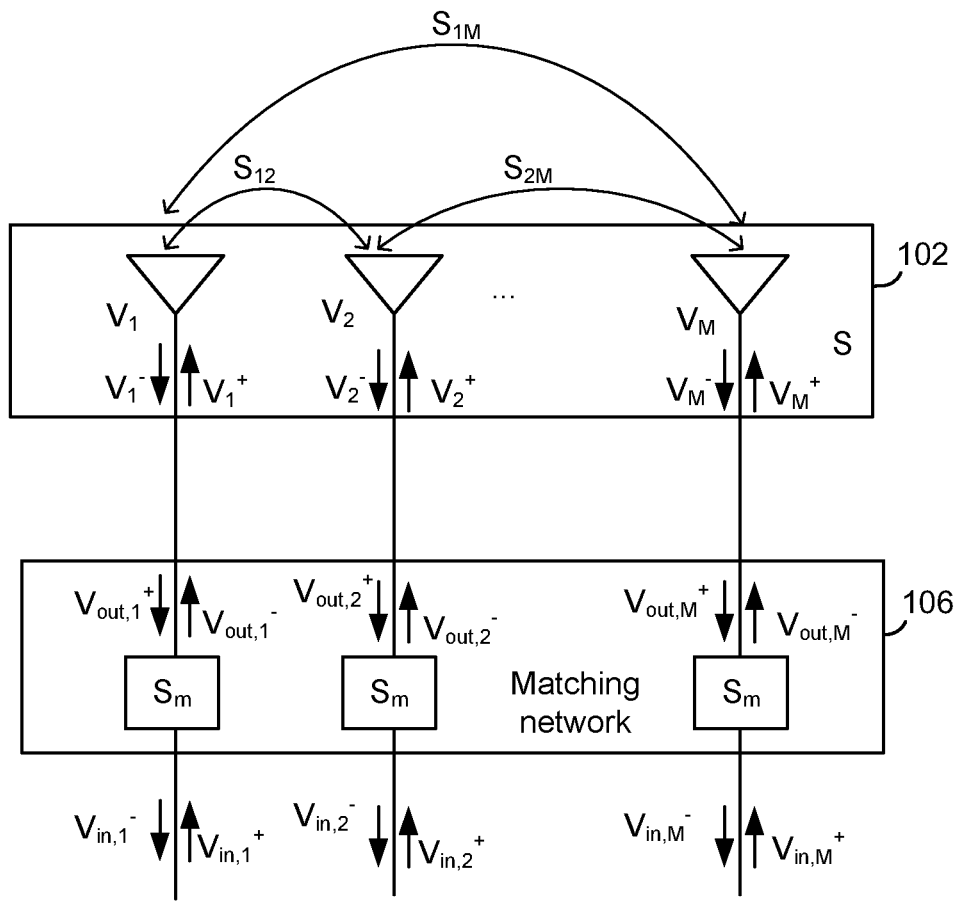
FIG. 3 shows a matching network.
Figure 4:
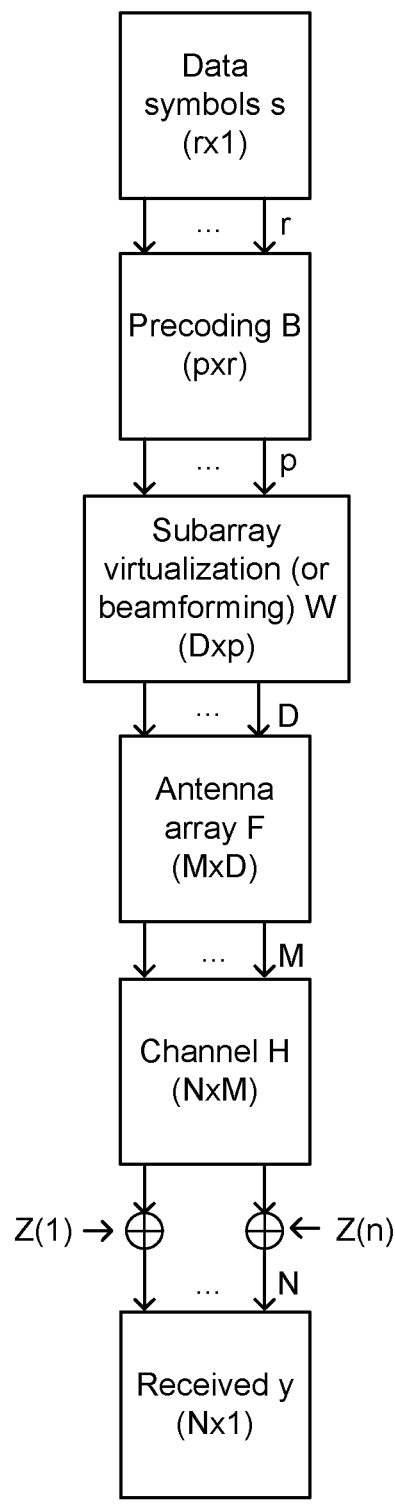
FIG. 4 shows functional blocks for generating a received signal in downlink.
Figure 5:
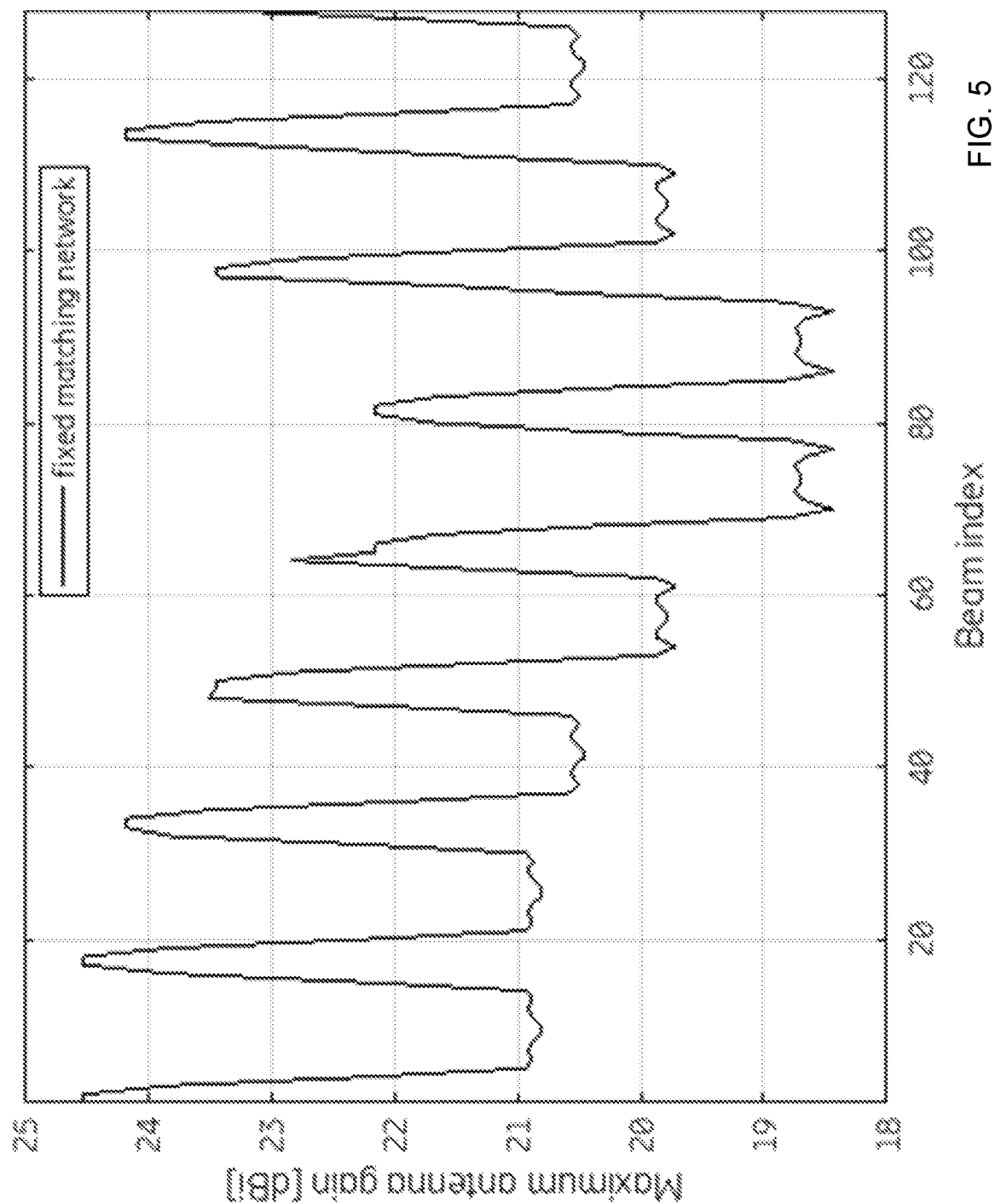
FIG. 5 shows a graph charting maximum antenna gain for a fixed matching network.

(Step 4) For the example matching network in FIG. 3, the 2-port network $S_m^i$ (connected to i-th antenna element) used to generate simulation results herein is given by:

$$S_m^i = \begin{bmatrix} S_{11}^i & S_{12}^i \\ S_{21}^i & S_{22}^i \end{bmatrix} = \begin{bmatrix} (S_a^i)^* & \sqrt{1-|S_a^i|^2} \\ \sqrt{1-|S_a^i|^2} & -(S_a^i)^* \end{bmatrix}$$

$V_{out}$ and $V_{in}$ are related through $S_m^i$ by the following formula:

$$\begin{bmatrix} V_{in,i}^- \\ V_{out,i}^- \end{bmatrix} = \begin{bmatrix} S_{11}^i & S_{12}^i \\ S_{21}^i & S_{22}^i \end{bmatrix} * \begin{bmatrix} V_{in,i}^+ \\ V_{out,i}^+ \end{bmatrix}$$

Accordingly, embodiments may include a set of candidate matching networks defined by the pair (element, excitation), where the element choices may be indicated by 1 to M+1 and the excitation choices may be indicated by 1 to D1+1 (where D1=O*O*D).

In embodiments, for each traffic beam (e.g., represented by one BF weight vector W), different matching networks corresponding to different (element, excitation) pairs may be considered for generating the given traffic beam. The matching network can be represented by the corresponding (element, excitation) pair, or by the resulting embedded element radiation pattern E. In some embodiments, the matching network which maximizes the maximum antenna gain is selected for the each considered traffic beam, such that for a given traffic beam the matching network is given by:

$$\underset{(element, excitation)}{\operatorname{argmax}} \left( \underset{(\theta,\phi)}{\operatorname{max}}(\text{antenna gain}) \right) \text{ where}$$

$$\text{antenna gain} = 10 * \log_{10}(E * V * W).$$

Figure 6:
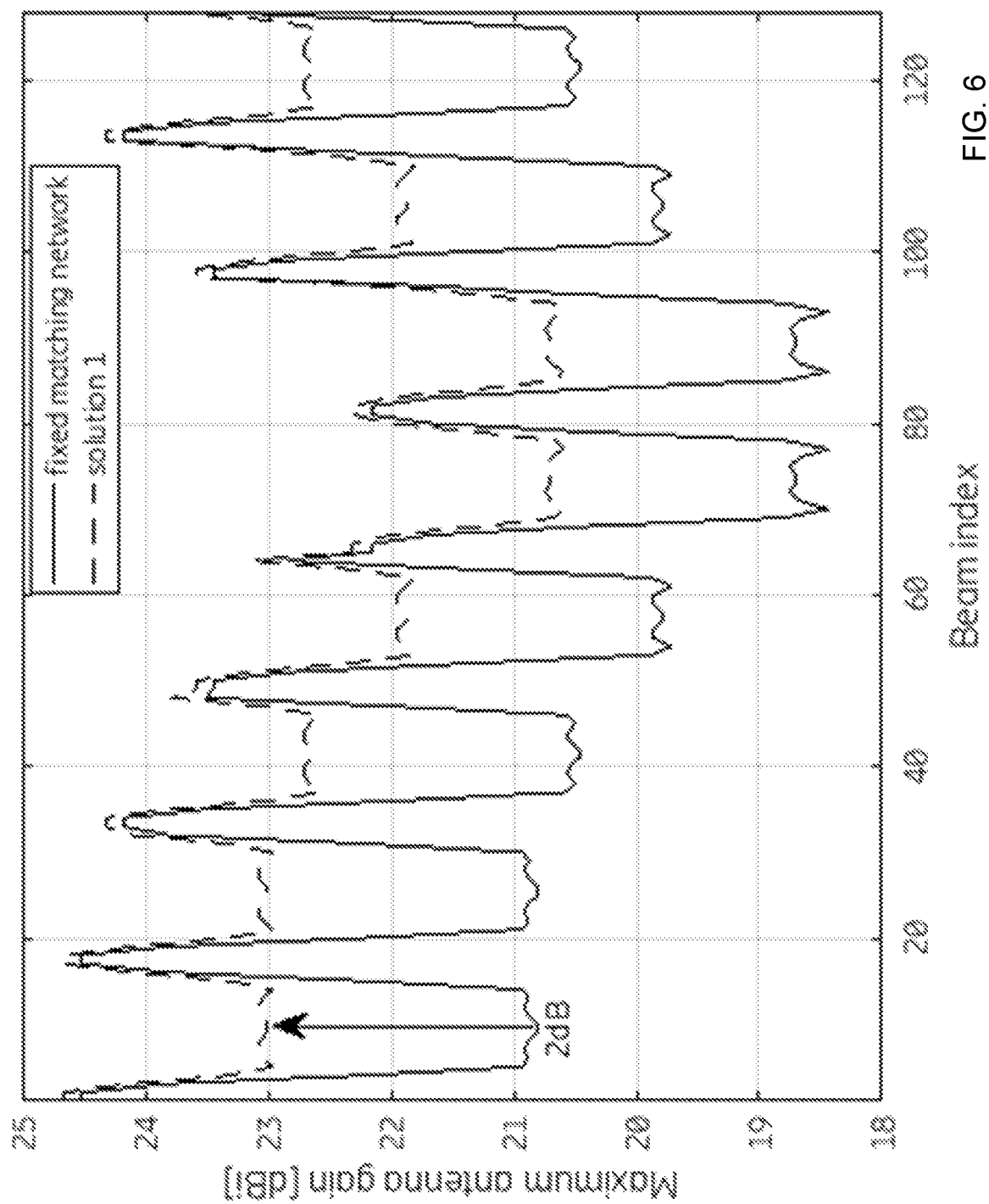
FIG. 6 shows a graph charting maximum antenna gain for both a fixed matching network and an embodiment assigning more than one matching network.

Note that one matching network may give maximum antenna gains for multiple traffic beams. In the example shown in FIG. 6 (where each traffic beam is assigned a matching network that results in the maximum antenna gain for that traffic beam), about 2 dB gain can be achieved relative to the fixed matching network described with respect to FIG. 3. As shown, the solid line indicates the maximum antenna gain using a fixed matching network, and the dashed line represents the embodiment where each traffic beam is assigned a matching network that results in the maximum antenna gain for that traffic beam. In the example of FIG. 6, there are 27 unique matching networks, or (element, excitation) pairs, that are assigned to each of the 128 beam indexes to generate the 128 traffic beams. In other embodiments, the number of unique matching networks may be more or less than this, and in general in order to achieve the maximum antenna gain for each traffic beam, the number of unique matching networks could be as high as the number of beam indexes.

Figure 7:
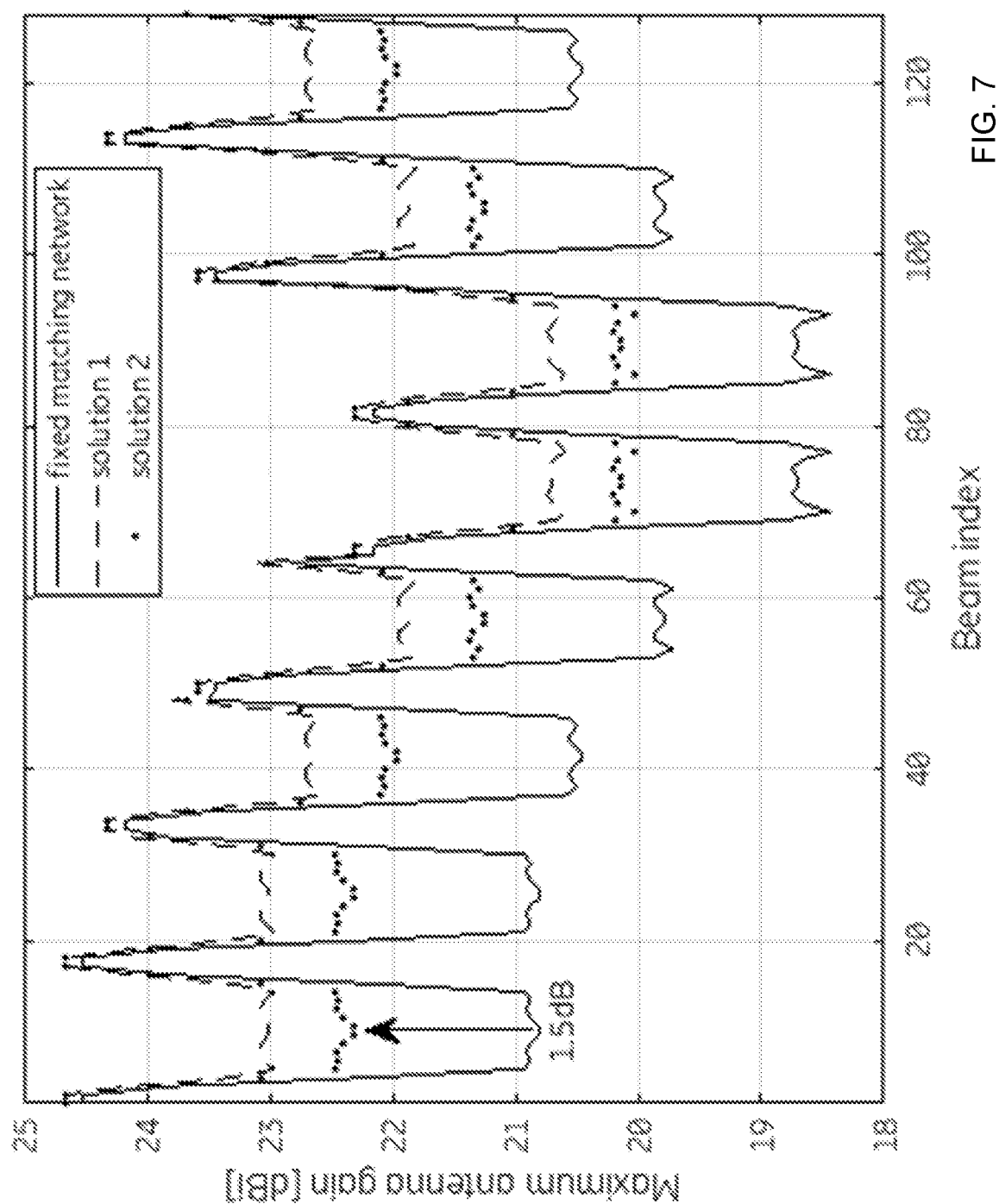
FIG. 7 shows a graph charting maximum antenna gain for both a fixed matching network and embodiments assigning more than one matching network.

While maximizing the maximum gain for each traffic beam results in significant improvements (such as shown in the example of FIG. 6), doing so may also increase complexity. Therefore, some embodiments utilize a limited number (n) of unique matching networks, in order to gain comparable improvements with less complexity requirements. For example, in embodiments n may be much less than the number of beam indexes (n<<D1), and in more particular embodiments, n may be equal to any one of 2, 3, 4, and 5. An example of this (where n=2) is illustrated in FIG. 7. FIG. 7 shows the fixed case (solid line) and gain-maximizing case (dashed line) of FIG. 6, and adds to it a dotted line where each beam index is assigned to one of two matching networks.

In particular, the first matching network to generate FIG. 7 is the pair (element, excitation)=(1,129), which is used to generate 96 beams out of the total 128 beams, and the second matching network is the pair (element, excitation)=(65,129), which is used to generate 32 beams out of the total 128 beams. Whereas assigning to each beam index the matching network that maximizes its antenna gain resulted in a 2 dB improvement over the fixed case, limiting the number of unique matching networks to 2 resulted in a 1.5 dB improvement over the fixed case. In certain embodiments, the trade-off in terms of complexity of using only 2 matching networks instead of the 27 of FIG. 6, may be worth making.

In some embodiments, CSI-RS resources are extended such that the use of different matching networks may occur without the UE being aware of the different matching networks, and without the UE experiencing an inconsistent view of the channel between the UE and the base station or other network node.

An important element in any mobile system is the channel matrix H that describes how signals are varied when propagating between different nodes, e.g. between the gNB and the UE. The channel matrix is used for many purposes and it is generally important to ensure a consistent view of the channel matrix between different nodes, for example the gNB and the UE. The channel matrix includes all effects that occur between the transmission and receiving points, where these points typically are defined by the "last" points in the transmitter and receiver chains where signals still exhibit observability and controllability, i.e. input and/or output signals to the channel matrix can be dynamically controlled by relevant radio/baseband parts. Note that these points can depend on e.g. architecture and used beamforming scheme. For example, effects from a matching network in the antenna gain matrix F are absorbed into the channel matrix. Hence, changing the matching network dynamically depending on the beam index means changing the effective channel. As the UE is unaware of this dependency, this can result in an inconsistent view of the channel between UE and gNB, that could negatively affect performance.

While in some embodiments it may be possible to signal to the UE the selected matching network, in other embodiments the UE can be made to remain unaware of the particular matching network being used without experiencing an inconsistent view of the channel.

An inconstant view of the channel could result from the following scenario. Where the matching network is adapted based on the precoding matrix for the digital BF, for instance, the semi-static function F will dynamically depend on the precoding matrix $B_k$, i.e. $F=F_j$, where the index j is a function of the precoding index k, such that j=f(k). This also means that the effective channel now depends on the pre-coding matrix $H_{eff,j}=HF_jW_l$, which means that the effective channel used when applying a precoding matrix might be different compared to the channel used when the UE estimated the channel, hence a mismatch that could lead to degraded performance.

For example, assume that a fixed matching network is used when sending a CSI-RS resource ($F_1$), giving the effective channel $H_{eff,1}=HF_1W_l$. If the UE recommends precoder index 5 corresponding to, as an example, a different matching network, there is then a mismatch between the channels, meaning that it is not certain that index 5 is optimal anymore.

In one embodiment, the number of CSI-RS resources may be extended to cover the different matching networks. For example, assume that m CSI-RS resources are used when not taking the different matching networks into consideration, where each resource is associated with a subarray virtualization matrix $W_1$. If there are d different matching networks, then instead of transmitting m CSI-RS resources, the network could instead transmit dxm CSI-RS resources (i.e. a set of CSI-RS resources for each unique matching network), with associated effective subarray virtualization matrices $W_{j,l}=F_j W_l$, $j=1, \ldots, d$ and $l=1, \ldots, m$. This means that the UE will estimate the optimal precoder based on all subarray virtualization matrices and all matching networks and will feed back the preferred matching network and precoding matrix. Note that this process is transparent to the UE, i.e. the UE does not need to know whether different matching networks are being used or not. Currently there is a limit to how many CSI-RS processes a UE can process in parallel, meaning that the number dxm of CSI-RS resources is effectively limited. It may be desirable in certain circumstances, therefore, to limit the number of unique matching networks used (e.g., to d=2). In such cases, and since the number of CSI-RS processes is in many cases small (e.g., m=1, 2 or 4), the total number of CSI-RS processes a UE will need to process may be small, making it more likely that the UE will be able to make the necessary computations.

In some embodiments, the network node (such as the gNB) may select the unique number of matching networks to be used based on the known capabilities of a given UE or based on the known capabilities of the least-capable UE (e.g. in terms of CSI-RS processing) that is currently being served.

In some embodiments, the fact that the optimal precoder matrix typically changes slowly may be utilized for advantage. This is particularly true for the "directional" component of the precoding matrix, which in turn is what affects the average power in that direction, which is what is being optimized by choosing different matching networks. Hence, when transmitting CSI-RS resources, some embodiments may choose to use the matching network that was used in the previous data transmission. There may be channel mismatch when the UE recommends a precoding matrix associated with a matching network different from what was used when sending the CSI-RS resource, but because the gNB immediately will change the matching network associated with CSI-RS to the given situation, the matching network associated with CSI-RS and data will tend to converge quickly and remain fixed as long as directional properties remain stable.

In some embodiments, the network may make use of hypothesis testing on different matching networks for CSI measurement. For example, for reciprocity-based beamforming, where the channel is not fed back from the UE but rather explicitly estimated at the gNB based on uplink signals, there will not be a mismatch in terms of matching network. However, there might still be a gain by using different matching networks depending on directional properties of the channel (as the function F contains non-linear components). One approach to capture this would be to hypothesis test the effective channel based on different matching networks, e.g. using two different matching networks leads to two different channels that potentially gives different CSI-like precoding matrices with different performance. Where it may be difficult in practice to do the hypothesis testing in parallel, embodiments may use adjacent symbols (e.g., two adjacent symbols) for the testing.

In some embodiments, different physical channels with different types of BF (such as digital and analog BF) in different directions (such as downlink (DL) and uplink (UL)) may use different virtualization and precoding matrices (e.g. common cell shapes for synchronization signal block (SSB) beams). The descriptions above have focused on DL data (physical downlink shared channel (PDSCH)) processing with either analog BF or digital BF, although the description can be generalized to other channels in DL or UL and such generalizations are within the scope of the embodiments described herein.

In some embodiments, changing the matching network affects the relative characteristics between precoders in the codebook. Matching networks may be selected to maximize the maximum antenna gain of each BF weight in analog BF, or each precoder in the codebook in digital BF. Other criteria for optimizing the matching network are possible, and the precise criteria selected may depend on a particular situation. For example, another criteria might include maximizing coverage or MU-MIMO performance. Maximizing coverage would mean maximizing the gain (as generally described herein). Maximizing MU-MIMO performance could entail other optimizations, however, such as minimizing side-lobe levels. These other optimizations are also within the scope of embodiments described herein.

Figure 8:
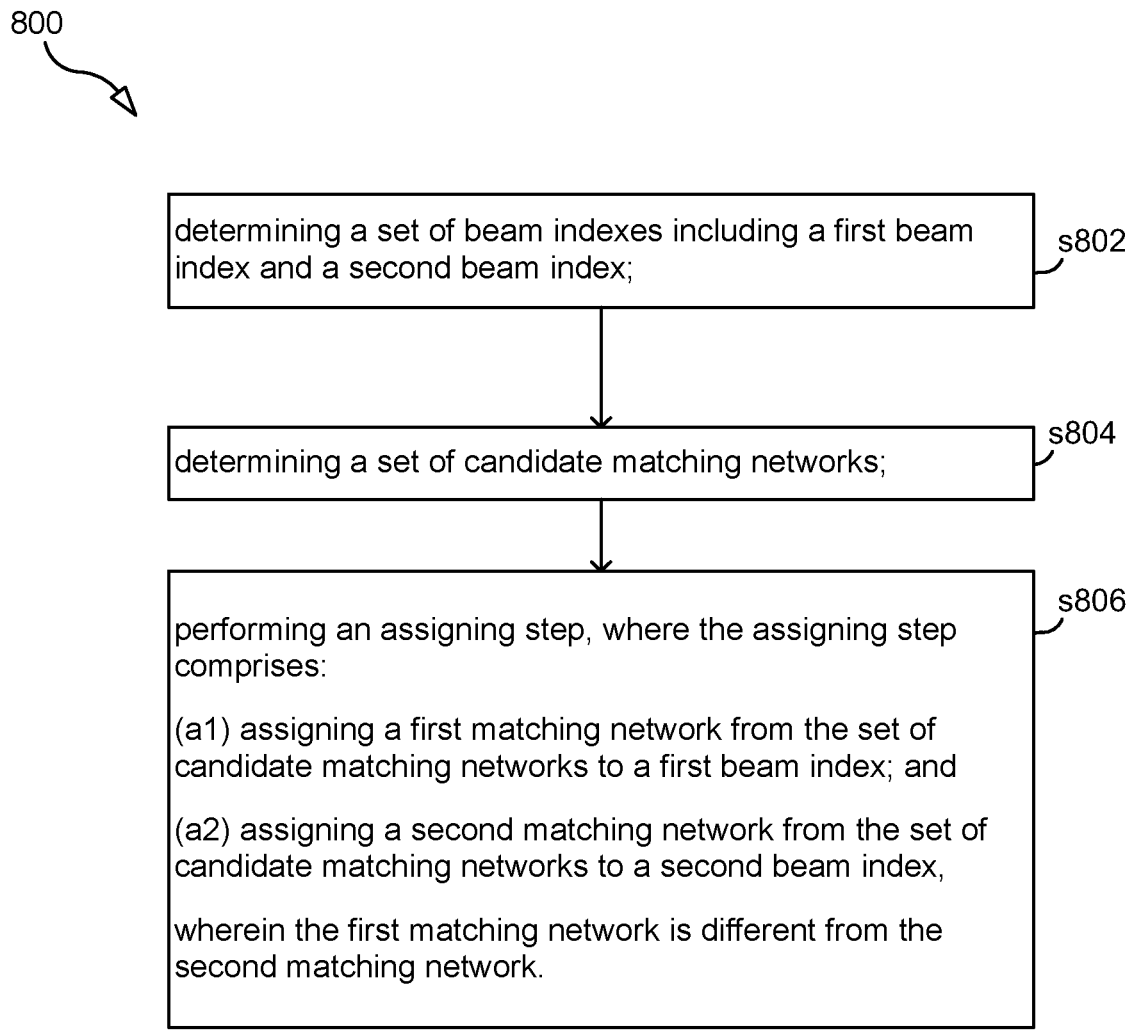
FIG. 8 shows a flow chart according to an embodiment.

FIG. 8 is a flowchart illustrating a process 800 according to some embodiments. Process 800 may begin with step s802. In some embodiments, process 800 may be performed by a network node (e.g., a base station such as a gNB).

Step s802 comprises determining a set of beam indexes including a first beam index and a second beam index.

Step s804 comprises determining a set of candidate matching networks.

Step 806 comprises performing an assigning step, where the assigning step comprises: (a1) assigning a first matching network from the set of candidate matching networks to a first beam index; and (a2) assigning a second matching network from the set of candidate matching networks to a second beam index. The first matching network is different from the second matching network.

In some embodiments, the set of beam indexes that is determined may include all possible beam indexes, or a subset of such beam indexes. Beam index should be understood broadly. For instance, a beam index may be represented by, for example, a precoding matrix indicator (PMI) or some other measure or feedback related to what precoder to use. The beam index may not be associated with a "beam" in the classical sense. For instance, a beam may refer to a set of precoding weights used to define how a signal is mapped to the antenna elements. Several such sets of precoding weights may make up a codebook, and that codebook may (in some embodiments) be the set of beams represented by the set of beam indexes.

In some embodiments, the method further includes performing a gain-determining step, wherein the gain-determining step comprises: (g1) determining a first gain value corresponding to the first beam index and the first matching network, wherein assigning the first matching network to the first beam index is based at least in part on the first gain value, and (g2) determining a second gain value corresponding to the second beam index and the second matching network, wherein assigning the second matching network to the second beam index is based at least in part on the second gain value.

In some embodiments, the method further includes performing a gain-determining step, wherein the gain-determining step comprises determining a corresponding gain value for each combination of beam index and candidate matching network in the set-product of the set of beam indexes and the set of candidate matching networks. The assigning step further comprises: assigning, for each beam index in the set of beam indexes that is not assigned a matching network, a corresponding matching network based on the corresponding gain values. Assigning the first matching network from the set of candidate matching networks to the first beam index is based on the corresponding gain value, and assigning the second matching network from the set of candidate matching networks to the second beam index is based on the corresponding gain value.

In some embodiments, the method further includes performing a side-lobe-determining step, wherein the side-lobe-determining step comprises determining a corresponding side-lobe value for each combination of beam index and candidate matching network in the set-product of the set of beam indexes and the set of candidate matching networks. The assigning step further comprises: assigning, for each beam index in the set of beam indexes that is not assigned a matching network, a corresponding matching network based on the corresponding side-lobe values. Assigning the first matching network from the set of candidate matching networks to the first beam index is based on the corresponding side-lobe value, and assigning the second matching network from the set of candidate matching networks to the second beam index is based on the corresponding side-lobe value.

In some embodiments, the assigning step results in each beam index being assigned a matching network that has the maximum gain value for the given beam index.

In some embodiments, the assigning step results in a total of n unique matching networks being assigned to each of the beam indexes, n being less than the size of the set of beam indexes, and wherein the assigning step further results in a criteria related to the determined gain values being satisfied. In some embodiments, n is less than five, and n may be equal to one of 2, 3, 4, and 5. In embodiments, n is much less than the size of the set of beam indexes.

In some embodiments, the criteria related to the determined gain values comprises a total gain value being maximized, wherein the total gain value is the sum for each beam index of the set of beam indexes of the corresponding gain value for that beam index and the corresponding matching network that is assigned to that beam index. That is, the assignments of beam index to matching network is given by:

$$\underset{(all\ assignments)}{\mathrm{argmax}} \sum_i \mathrm{gain}\ (beam_i, network_i)$$

where $beam_i$ is the beam corresponding to beam index i, $network_i$ is the network that is assigned to beam index i, $\mathrm{gain}(beam_i, network_i)$ refers to the corresponding gain value determined in the gain-determining step, the sum is over all beam indexes i, and the max operator is over the different possible assignments of up to n unique networks from among the set of candidate networks to each of the beam indexes i.

In some embodiments, the criteria related to the determined gain values comprises a partial gain value being maximized, wherein the partial gain value is the sum for each beam index of a subset of the set of beam indexes of the corresponding gain value for that beam index and the corresponding matching network that is assigned to that beam index. That is, the assignments of beam index to matching network is given by:

$$\underset{(all\ assignments)}{\mathrm{argmax}} \sum_i \mathrm{gain}\ (beam_i, network_i)$$

where $beam_i$ is the beam corresponding to beam index i, $network_i$ is the network that is assigned to beam index i, $\mathrm{gain}(beam_i, network_i)$ refers to the corresponding gain value determined in the gain-determining step, the sum is over a subset of all beam indexes i, and the max operator is over the different possible assignments of up to n unique networks from among the set of candidate networks to each of the beam indexes i. For example, in certain circumstances it may be preferable to optimize the gain for a subset of indexes, such as those corresponding to certain directions or serving particular user equipments (UEs).

In some embodiments, the criteria related to the determined gain values comprises a minimum gain value being maximized, wherein the minimum gain value is the minimum for each beam index of the set of beam indexes of the corresponding gain value for that beam index and the corresponding matching network that is assigned to that beam index. That is, the assignments of beam index to matching network is given by:

$$\underset{(all\ assignments)}{\mathrm{argmax}} \underset{i}{\mathrm{min}}\ \mathrm{gain}\ (beam_i, network_i)$$

where $beam_i$ is the beam corresponding to beam index i, $network_i$ is the network that is assigned to beam index i, $\mathrm{gain}(beam_i, network_i)$ refers to the corresponding gain value determined in the gain-determining step, the min operator is over all beam indexes i, and the max operator is over the different possible assignments of up to n unique networks from among the set of candidate networks to each of the beam indexes i. In some embodiments, the min operator may be over a subset of all beam indexes i.

In some embodiments, the criteria related to the determined gain values comprises a total difference value being minimized, wherein the total difference value is the sum for each beam index of the set of beam indexes of the difference between the corresponding gain value for that beam index and the corresponding matching network that is assigned to that beam index and the average of each of the corresponding gain values. That is, the assignments of beam index to matching network is given by:

$$\underset{(all\ assignments)}{\mathrm{argmin}} \sum_i \{\mathrm{gain}\ (beam_i, network_i) - \sigma\}$$

where $beam_i$ is the beam corresponding to beam index i, $network_i$ is the network that is assigned to beam index i, $\mathrm{gain}(beam_i, network_i)$ refers to the corresponding gain value determined in the gain-determining step, a is the average gain value for the given assignment of matching networks to beam indexes $$\left(\text{i.e., } \underset{i}{\mathrm{avg}}\ \mathrm{gain}\ (beam_i, network_i)\right),$$

the sum is over all beam indexes i, and the min operator is over the different possible assignments of up to n unique networks from among the set of candidate networks to each of the beam indexes i. In some embodiments, the sum may be over a subset of all beam indexes i.

In some embodiments, the first matching network is represented by a first pair (element1, excitation1) and the second matching network is represented by a second pair (element2, excitation2). In some embodiments, the method further includes associating a first set of channel state information (CSI) reference signals (RSs) (CSI-RSs) with the first matching network and a second set of CSI-RSs with the second matching network; receiving a CSI-RS information; and determining which matching network to use based on the received CSI-RS information, wherein determining which matching network to use based on the received CSI-RS information comprises selecting the first matching network if the received CSI-RS information belongs to the first set of CSI-RSs, and selecting the second matching network if the received CSI-RS information belongs to the second set of CSI-RSs. In some embodiments, the method further includes associating a third set of CSI-RSs with a third matching network, and wherein determining which matching network to use further comprises selecting the third matching network if the received CSI-RS information belongs to the third set of CSI-RSs. In additional embodiments, there may be a set of CSI-RSs associated with each unique matching network that is assigned to the set of beam indexes.

Figure 9:
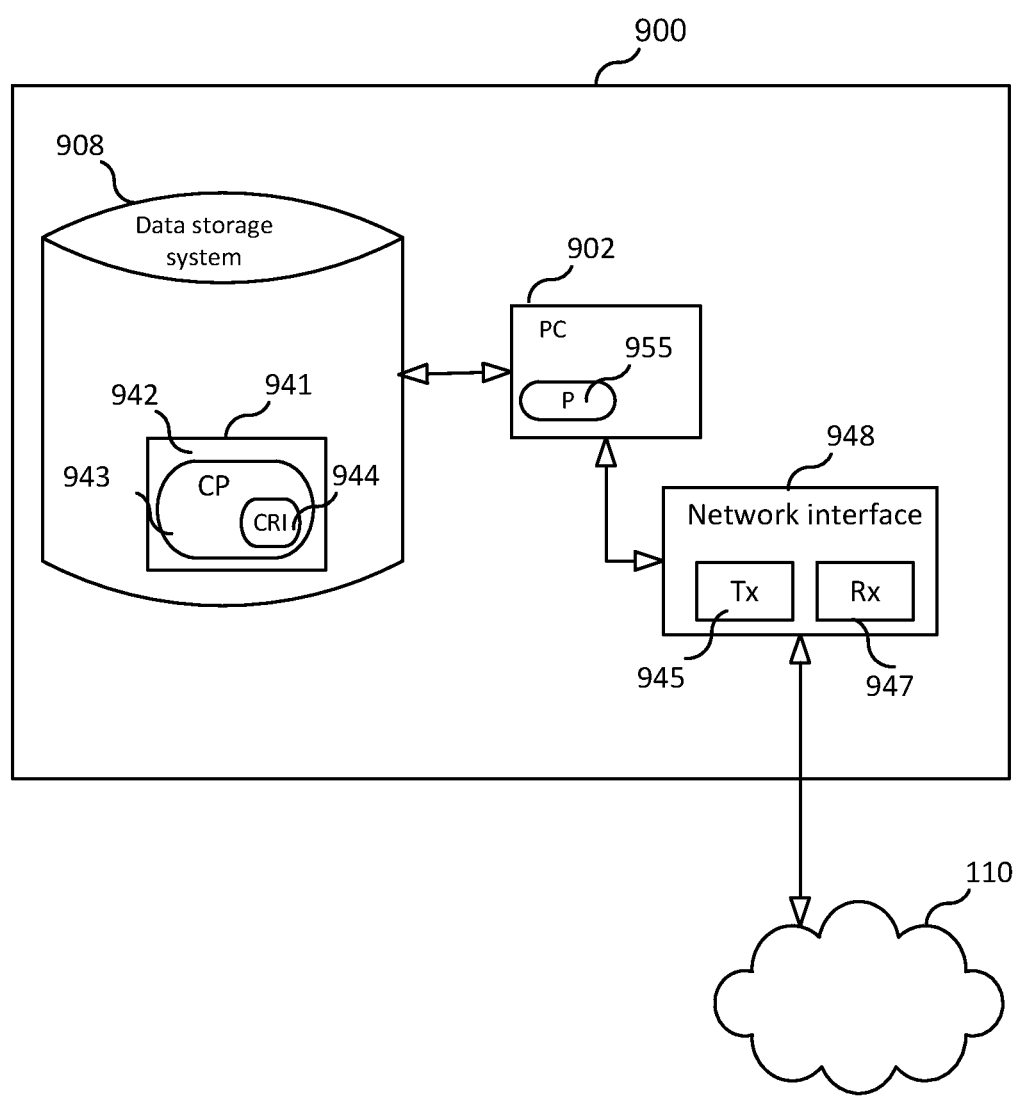
FIG. 9 is a block diagram illustrating an apparatus, according to an embodiment, for performing steps disclosed herein.

FIG. 9 is a block diagram of an apparatus 900, according to some embodiments. Apparatus 900 may be a network node, such as a base station (e.g. a gNB). As shown in FIG. 9, apparatus 900 may comprise: processing circuitry (PC) 902, which may include one or more processors (P) 955 (e.g., a general purpose microprocessor and/or one or more other processors, such as an application specific integrated circuit (ASIC), field-programmable gate arrays (FPGAs), and the like), which processors 955 may be co-located in a single housing or in a single data center or may be geographically distributed (i.e., apparatus 900 may be a distributed apparatus); a network interface 948 comprising a transmitter (Tx) 945 and a receiver (Rx) 947 for enabling apparatus 900 to transmit data to and receive data from other nodes connected to network 110 (e.g., an Internet Protocol (IP) network) to which network interface 948 is connected; and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes apparatus 900 to perform steps described herein (e.g., steps described herein with reference to the flow charts). In other embodiments, apparatus 900 may be configured to perform steps described herein without the need for code. That is, for example, PC 902 may consist merely of one or more ASICs. Hence, the features of the embodiments described herein may be implemented in hardware and/or software.

Figure 10:
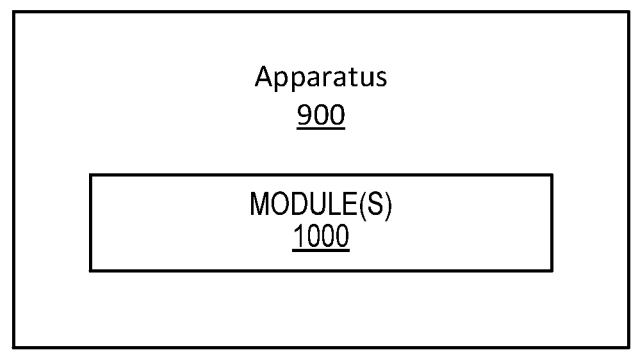
FIG. 10 is a block diagram illustrating an apparatus, according to an embodiment, for performing steps disclosed herein.

FIG. 10 is a schematic block diagram of the apparatus 900 according to some other embodiments. The apparatus 900 includes one or more modules 1000, each of which is implemented in software. The module(s) 1000 provide the functionality of apparatus 900 described herein and, in particular, the functionality of a network node (e.g., the steps herein, e.g., with respect to FIG. 8).

While various embodiments are described herein (including the attached appendices which contain proposals to modify a 3GPP standard), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
 determining a set of beam indexes including a first beam index and a second beam index;
 determining a set of candidate matching networks; and
 performing an assigning step, where the assigning step comprises:
  (a1) assigning a first matching network from the set of candidate matching networks to a first beam index; and
  (a2) assigning a second matching network from the set of candidate matching networks to a second beam index, wherein
 the first matching network is different from the second matching network.

2. The method of claim 1, further comprising:
 performing a gain-determining step, wherein the gain-determining step comprises:
  (g1) determining a first gain value corresponding to the first beam index and the first matching network, wherein assigning the first matching network to the first beam index is based at least in part on the first gain value; and
  (g2) determining a second gain value corresponding to the second beam index and the second matching network, wherein assigning the second matching network to the second beam index is based at least in part on the second gain value.

3. The method of claim 1, further comprising:
 performing a gain-determining step, wherein the gain-determining step comprises determining a corresponding gain value for each combination of beam index and candidate matching network in the set-product of the set of beam indexes and the set of candidate matching networks, wherein
 the assigning step further comprises: assigning, for each beam index in the set of beam indexes that is not assigned a matching network, a corresponding matching network based on the corresponding gain values,
 assigning the first matching network from the set of candidate matching networks to the first beam index is based on the corresponding gain value, and
 assigning the second matching network from the set of candidate matching networks to the second beam index is based on the corresponding gain value.

4. The method of claim 3, wherein the assigning step results in each beam index being assigned a matching network that has the maximum gain value for the given beam index.

5. The method of claim 3, wherein the assigning step results in a total of n unique matching networks being assigned to each of the beam indexes, n being less than the size of the set of beam indexes, and wherein the assigning step further results in a criteria related to the determined gain values being satisfied.

6. The method of claim 5, wherein n is less than five.

7. The method of claim 5, wherein the criteria related to the determined gain values comprises a total gain value being maximized, wherein the total gain value is the sum for each beam index of the set of beam indexes of the corresponding gain value for that beam index and the corresponding matching network that is assigned to that beam index.

8. The method of claim 5, wherein the criteria related to the determined gain values comprises a partial gain value being maximized, wherein the partial gain value is the sum for each beam index of a subset of the set of beam indexes of the corresponding gain value for that beam index and the corresponding matching network that is assigned to that beam index.

9. The method of claim 5, wherein the criteria related to the determined gain values comprises a minimum gain value being maximized, wherein the minimum gain value is the minimum for each beam index of the set of beam indexes of the corresponding gain value for that beam index and the corresponding matching network that is assigned to that beam index.

10. The method of claim 5, wherein the criteria related to the determined gain values comprises a total difference value being minimized, wherein the total difference value is the sum for each beam index of the set of beam indexes of the difference between the corresponding gain value for that beam index and the corresponding matching network that is assigned to that beam index and the average of each of the corresponding gain values.

11. The method of claim 1, further comprising:
performing a side-lobe-determining step, wherein the side-lobe-determining step comprises determining a corresponding side-lobe value for each combination of beam index and candidate matching network in the set-product of the set of beam indexes and the set of candidate matching networks, wherein
the assigning step further comprises: assigning, for each beam index in the set of beam indexes that is not assigned a matching network, a corresponding matching network based on the corresponding side-lobe values,
assigning the first matching network from the set of candidate matching networks to the first beam index is based on the corresponding side-lobe value, and
assigning the second matching network from the set of candidate matching networks to the second beam index is based on the corresponding side-lobe value.

12. The method of claim 1, wherein the first matching network is represented by a first pair (element1, excitation1) and the second matching network is represented by a second pair (element2,excitation2).

13. The method of claim 1, further comprising:
associating a first set of channel state information (CSI) reference signals (RSs) (CSI-RSs) with the first matching network and a second set of CSI-RSs with the second matching network;
receiving a CSI-RS information; and
determining which matching network to use based on the received CSI-RS information, wherein determining which matching network to use based on the received CSI-RS information comprises selecting the first matching network if the received CSI-RS information belongs to the first set of CSI-RSs, and selecting the second matching network if the received CSI-RS information belongs to the second set of CSI-RSs.

14. The method of claim 13, further comprising associating a third set of CSI-RSs with a third matching network, and wherein determining which matching network to use further comprises selecting the third matching network if the received CSI-RS information belongs to the third set of CSI-RSs.

15. A non-transitory computer readable medium storing a computer program comprising instructions which when executed by processing circuitry of a node causes the node to perform the method of claim 1.

16. A node comprising:
a data storage system; and
a data processing apparatus comprising a processor, wherein the data processing apparatus is coupled to the data storage system, and the node is configured to:
determine a set of beam indexes including a first beam index and a second beam index;
determine a set of candidate matching networks; and
perform an assigning step, where the assigning step comprises:
(a1) assigning a first matching network from the set of candidate matching networks to a first beam index; and
(a2) assigning a second matching network from the set of candidate matching networks to a second beam index, wherein
the first matching network is different from the second matching network.

17. The node of claim 16, wherein the node is further configured to:
perform a gain-determining step, wherein the gain-determining step comprises determining a corresponding gain value for each combination of beam index and candidate matching network in the set-product of the set of beam indexes and the set of candidate matching networks, wherein
the assigning step further comprises: assigning, for each beam index in the set of beam indexes that is not assigned a matching network, a corresponding matching network based on the corresponding gain values,
assigning the first matching network from the set of candidate matching networks to the first beam index is based on the corresponding gain value, and
assigning the second matching network from the set of candidate matching networks to the second beam index is based on the corresponding gain value.

18. The node of claim 15, wherein the node is further configured to:
perform a gain-determining process that includes:
(g1) determining a first gain value corresponding to the first beam index and the first matching network, wherein assigning the first matching network to the first beam index is based at least in part on the first gain value; and
(g2) determining a second gain value corresponding to the second beam index and the second matching network, wherein assigning the second matching network to the second beam index is based at least in part on the second gain value.

* * * * *